United States Patent
Poola et al.

(10) Patent No.: US 8,837,453 B2
(45) Date of Patent: Sep. 16, 2014

(54) METHODS AND APPARATUS FOR TRANSMITTING DATA BASED ON INTERFRAME DEPENDENCIES

(75) Inventors: Jeelan Poola, Bangalore (IN); Somesh Agrawal, Bangalore (IN); Ian Chakeres, Columbus, OH (US); Ravindra Guntur, Mysore (IN)

(73) Assignee: Symbol Technologies, Inc., Holtsville, NY (US)

( * ) Notice: Subject to any disclaimer, the term of this patent is extended or adjusted under 35 U.S.C. 154(b) by 1084 days.

(21) Appl. No.: 12/474,055

(22) Filed: May 28, 2009

(65) Prior Publication Data

US 2010/0302985 A1 Dec. 2, 2010

(51) Int. Cl.
*H04J 1/00* (2006.01)
*H04L 12/28* (2006.01)
*H04L 12/56* (2006.01)
*H04J 3/26* (2006.01)
*H04H 20/71* (2008.01)

(52) U.S. Cl.
USPC ............ 370/343; 370/312; 370/390; 370/432

(58) Field of Classification Search
USPC ....................................................... 370/343
See application file for complete search history.

(56) References Cited

U.S. PATENT DOCUMENTS

| | | | |
|---|---|---|---|
| 7,280,495 B1 | 10/2007 | Zweig et al. | |
| 7,697,559 B2* | 4/2010 | Yonemoto et al. | 370/432 |
| 8,175,020 B2* | 5/2012 | Beaudoin et al. | 370/312 |
| 2002/0042836 A1* | 4/2002 | Mallory | 709/232 |
| 2002/0057705 A1* | 5/2002 | Hagai et al. | 370/410 |
| 2002/0065648 A1* | 5/2002 | Amano | 704/216 |
| 2002/0150095 A1* | 10/2002 | Sherman | 370/389 |
| 2002/0154600 A1* | 10/2002 | Ido et al. | 370/216 |
| 2002/0191573 A1* | 12/2002 | Whitehill et al. | 370/338 |
| 2003/0009717 A1* | 1/2003 | Fukushima et al. | 714/748 |
| 2003/0162495 A1* | 8/2003 | Yonemoto et al. | 455/7 |
| 2003/0226094 A1* | 12/2003 | Fukushima et al. | 714/776 |
| 2004/0120345 A1* | 6/2004 | Yamaguchi et al. | 370/465 |
| 2005/0013303 A1* | 1/2005 | Gopalakrishnan et al. | 370/395.21 |
| 2005/0157714 A1* | 7/2005 | Shlissel et al. | 370/389 |
| 2005/0276263 A1* | 12/2005 | Suetsugu et al. | 370/389 |

(Continued)

FOREIGN PATENT DOCUMENTS

| | | |
|---|---|---|
| EP | 1879396 A2 | 1/2008 |
| EP | 2031805 A1 | 3/2009 |

OTHER PUBLICATIONS

Chakeres, I., et al., Fast, Efficient, and Robust Multicast in Wireless Mesh Networks, PE-WASUN'08 Oct. 27-28, 2008, Vancouver, BC, Canada.

(Continued)

*Primary Examiner* — Ian N. Moore
*Assistant Examiner* — Jenee Williams

(57) ABSTRACT

Methods and apparatus are provided for reliably transmitting data. A method comprises identifying a metric for a first frame of a plurality of frames, wherein the metric is indicative of decoding significance for the first frame among the plurality of frames. When the metric corresponds to a relatively high decoding significance, the method further comprises transmitting the first frame in accordance with an enhanced transmission scheme. When the metric corresponds to a relatively low decoding significance, the method further comprises transmitting the first frame in accordance with a default transmission scheme. The reliability of the enhanced transmission scheme is greater than the reliability of the default transmission scheme.

16 Claims, 4 Drawing Sheets

(56) References Cited

U.S. PATENT DOCUMENTS

2006/0164987 A1* 7/2006 Ruiz Floriach et al. ...... 370/235
2008/0002621 A1 1/2008 Ginzburg et al.
2011/0255535 A1* 10/2011 Tinsman ........................ 370/390

OTHER PUBLICATIONS

Ravindra, G., et al., In-Network Optimal Rate Reduction for Packetized MPEG Video, Q2Winet '08, Oct. 27-28, 2008, Vancouver, BC, Canada.

India Application No. 2787/DEL/2008, filed Dec. 10, 2008, entitled Method and System for Deterministic Packet Drop.

International Search Report and Written Opinion mailed on Jan. 25, 2011 for International Application No. PCT/US2010/034191.

Yang Xiao et al.: "MAC 15-1—A Cross-Layer Approach for Frame Transmissions of MPEG-4 over the IEEE 802.11e Wireless Local Area Networks," Mar. 31, 2008, Wireless Communications and Networking Conference, 2008, IEEE, Piscataway, USA, pp. 1728-1733.

International Preliminary Report on Patentability dated Nov. 29, 2011 for International Application No. PCT/US2010/034191.

* cited by examiner

METHODS AND APPARATUS FOR TRANSMITTING DATA BASED ON INTERFRAME DEPENDENCIES

TECHNICAL FIELD

Embodiments of the subject matter described herein relate generally to wireless network infrastructures, and more particularly, embodiments of the subject matter relate to reliably transmitting video data in a wireless network.

BACKGROUND

Many wireless networks (such as wireless local area networks or WLANs), rely on infrastructure devices that establish data communication links with user devices (e.g., mobile devices and/or other wireless devices). These user devices communicate, via a wireless data communication channel, with a wireless access device (such as an access point or access port device), which in turn communicates with other network components via traditional wired interfaces. These wireless access devices generally communicate with the mobile and/or wireless devices using one or more RF channels (e.g., in accordance with one or more of the IEEE 802.11 standards).

Generally, in multicast wireless networks, the communications from a wireless access device to one or more downstream user devices are inherently unreliable as there are no default mechanisms for determining whether the transmitted data has reached the appropriate destination(s) (e.g., link level acknowledgement of received and/or lost data). This results and random data loss, which adversely affects the user experience. For example, in the case of video data which is encoded into video frames where some of the video frames reference other frames for decoding purposes, even relatively few lost frames results in an incorrect video data stream, which in turn, leads to improper decoding of the video data. As a result, the decoded video data being viewed by a user may freeze or otherwise exhibit degraded picture quality (e.g., tiling and/or scrambling). In addition, the available output bandwidth of the wireless access device may be less than the data rate of the video data, which leads to additional data loss and further exacerbates the problem.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
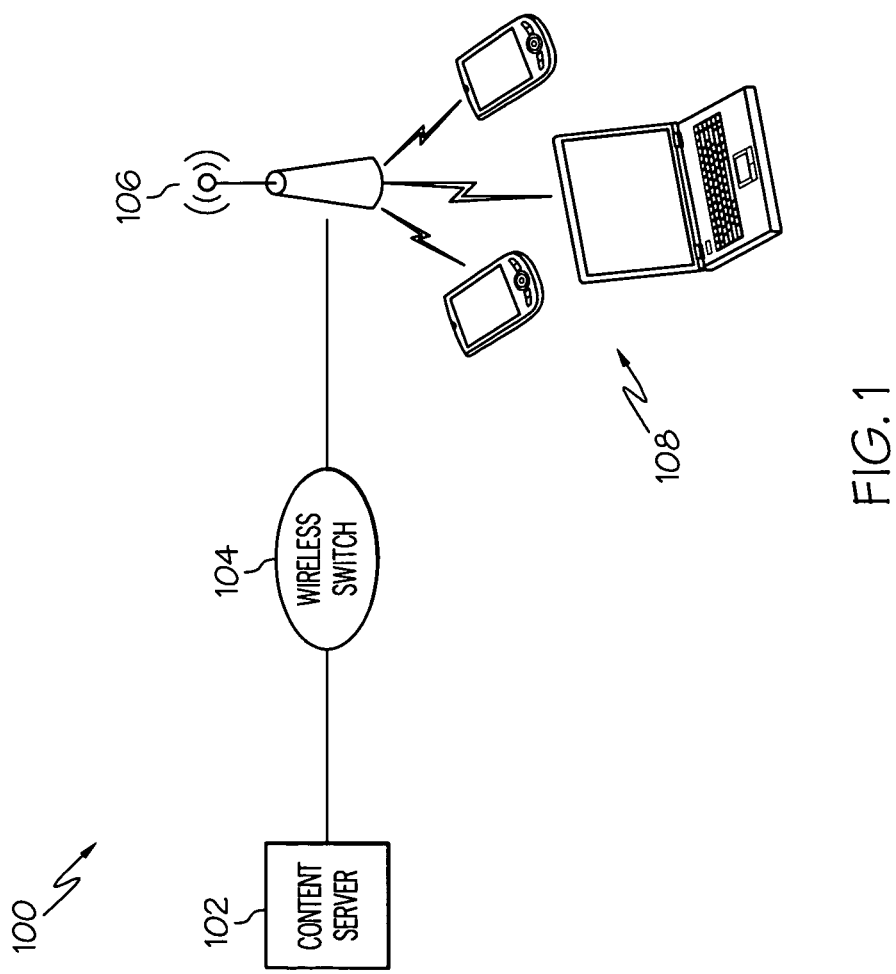
FIG. 1 is a schematic representation of an exemplary wireless network in accordance with one embodiment.

The following detailed description is merely illustrative in nature and is not intended to limit the embodiments of the subject matter or the application and uses of such embodiments. Furthermore, there is no intention to be bound by any expressed or implied theory presented in the preceding technical field, background, brief summary or the following detailed description.

Techniques and technologies may be described herein in terms of functional and/or logical block components and various processing steps. It should be appreciated that such block components may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments may be practiced in conjunction with any number of network architectures, data transmission protocols, and mobile device configurations, and that the system described herein is merely one suitable example.

For the sake of brevity, conventional techniques related to wireless signal processing, wireless data transmission, WLANs, signaling, network control, wireless switches, video encoding and/or decoding, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in a practical embodiment.

The following description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically.

Those of skill in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software depends upon the particular application and design constraints imposed on the overall system. Those familiar with the concepts described herein may implement such functionality in a suitable manner for each particular application.

Technologies and/or concepts described herein related to systems and methods for reliably transmitting interdependent data in wireless networks. The more important frames of the interdependent data for purposes of downstream decoding and/or processing are identified and transmitted in accordance with an enhanced transmission scheme. This results in a more reliable receipt (or a more likely successful receipt) of the important frames of the data and thereby improves decoding and/or process of the interdependent data on the user side. For example, in the case of video data, the more significant reference frames for decoding, such as I-frames and P-frames, may be transmitted differently than less significant frames such as B-frames. In addition, when bandwidth constraints are present, the effective data rate of the data may be selectively reduced in a manner that compensates for additional bandwidth consumption of the enhanced transmission scheme while minimizing and/or reducing random data loss. Thus, in the case of multicast streaming of data when the available output bandwidth is limited, the subject matter described herein achieves best case performance by ensuring that the most significant frames of the data are transmitted and reliably received.

Referring now to FIG. 1, in an exemplary embodiment, a wireless network 100 includes, without limitation, a content server 102, a plurality of wireless infrastructure devices, such as a wireless switch 104 and a wireless access device 106, and a plurality of wireless user devices 108. In an exemplary embodiment, the wireless network 100 is configured to support multicast communications from the wireless access device 106 to one or more wireless devices 108, and in practice, the wireless network 100 may include additional devices to support the functionality of the wireless network 100, such as Ethernet switches, and the like. In this regard, it will be appreciated in the art that the wireless switch 104 may be coupled to the content server 102 via a local network, which in turn may be coupled to one or more additional components and/or computer networks in a conventional manner.

It should be understood that FIG. 1 is a simplified representation of a wireless network 100 for purposes of explanation. A practical embodiment of the wireless network 100 may have any number of wireless switches 104, each supporting any number of wireless access devices 106, and each wireless access device supporting any number of wireless user devices 108. The topology and configuration of the wireless network 100 can vary to suit the needs of the particular application, and FIG. 1 is not intended to limit the application or scope of the subject matter in any way. In the illustrated embodiment embodiment, the wireless access device 106 is realized as an access port that cooperates with the wireless switch 104. In alternate embodiments, the wireless access device 106 can be realized as an access point that includes embedded processing capabilities that take the place of the various network intelligence and management functions normally provided by a wireless switch. It should be appreciated that the wireless switch 104 may not be used in such alternate embodiments, and that the features and/or functionality described below in the context of the wireless switch 104 may be equivalently incorporated into the wireless access device 106 in such embodiments that do not include a wireless switch 104. It should be noted that this decentralized management structure may become more complicated to implement as the size of the wireless network and/or number of access points in the network increases.

In an exemplary embodiment, the wireless network 100 is configured as a wireless local area network (WLAN). In alternative embodiments, the wireless network 100 may be configured as a wireless personal area network (WPAN), a wireless wide area network (WWAN), or any other suitable network configuration. The wireless network 100 may be configured to utilize a data communication protocol in accordance with IEEE 802.11, conventional Internet Protocol techniques, TCP/IP, hypertext transfer protocol (HTTP), SOAP, or another comparable protocol.

The content server 102 provides data and/or content for transmission to one or more wireless user devices 108. In an exemplary embodiment, the content server 102 is configured to provide streaming video data for multicast transmission to one or more wireless user devices 108, as described in greater detail below. In an exemplary embodiment, the wireless switch 104 is coupled to the content server 102 via a wired connection and/or a wired network. In an exemplary embodiment, the wireless access device 106 is coupled to the wireless switch 104, and depending on the embodiment, the wireless access device 106 may be coupled to the wireless switch 104 via one or more additional access devices, wireless switches, Ethernet switches, routers, and/or various combinations thereof. In accordance with one embodiment, the wireless access device 106 is configured to support multicast transmission of data to one or more wireless user devices 108 over wireless data communication links. As set forth above, depending on the embodiment, the wireless access device 106 may be realized as a wireless access port, which relies on the network intelligence and management functions provided by the wireless switch 104, or as a wireless access point which includes network intelligence and management functions incorporated therein.

A wireless user device 108 may be realized using any suitable platform, including, without limitation: a cellular telephone; a personal digital assistant; a digital media player; a portable video game device; a laptop or other portable computer; or the like. It should be appreciated that the functionality of the wireless user device 108 will largely be dependent on the user, manufacturer, or vendor responsible for configuring and/or designing the device, and the subject matter described herein is not limited to a particular wireless user device. In accordance with one embodiment, one or more of the wireless user devices 108 are configured to join a multicast group associated with and/or managed by the wireless switch 104 and/or wireless access device 106 in a conventional manner, as will be appreciated in the art.

Figure 2:
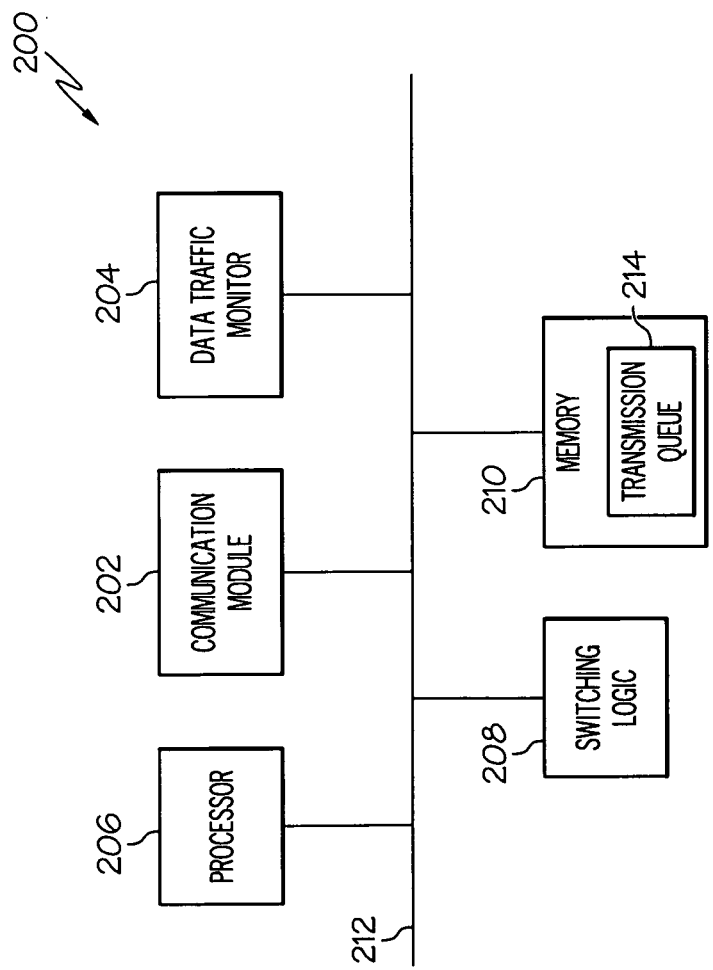
FIG. 2 is a schematic representation of an exemplary wireless infrastructure device suitable for use in the wireless network shown in FIG. 1 in accordance with one embodiment.

FIG. 2 is a schematic representation of an embodiment of a wireless infrastructure device 200 suitable for use in a network, such as, for example, as a wireless switch 104 or wireless access device 106 in the wireless network 100 shown in FIG. 1. In an exemplary embodiment, a wireless infrastructure device 200 may include, without limitation: a communication module 202, a data traffic monitor 204, a processor 206, switching logic 208, and a suitable amount of memory 210. The elements of wireless infrastructure device 200 may be interconnected together using a bus 212 or another suitable interconnection arrangement that facilitates communication between the various elements of wireless infrastructure device 200. It should be appreciated that FIG. 2 depicts the wireless infrastructure device 200 in an oversimplified manner, and a practical embodiment may include additional components and suitably configured processing logic to support known or conventional operating features that are not described in detail herein.

In an exemplary embodiment, wireless infrastructure device 200 contains intelligence and processing logic that facilitates control and management of data flowing to and/or from the wireless infrastructure device 200. Wireless infrastructure device 200 is suitably configured to receive data and transmit and/or route at least a portion of the received data to one or more devices in the wireless network. Depending on the embodiment, the wireless infrastructure device 200 may serve as a point of interconnection between a WLAN and a fixed wire (e.g., Ethernet) network, in other words, the wireless infrastructure device 200 may reside on the wired/wireless boundary.

In an exemplary embodiment, communication module 202 generally represents the hardware, software, firmware, processing logic, and/or other components of wireless infrastructure device 200 that enable bi-directional communication between wireless infrastructure device 200 and network components to which wireless infrastructure device 200 is coupled. For example, referring to FIG. 1, communication module 202 may be suitably configured to communicate with one or more components on the wireless network 100, such as the content server 102, the wireless switch 104, wireless access devices 106 and/or the wireless user devices 108. In accordance with one embodiment, communication module 202 provides an Ethernet interface such that wireless infrastructure device 200 can communicate with a conventional Ethernet-based computer network. In this regard, communication module 202 may include a physical interface for connection to the computer network.

In some embodiments, when the wireless infrastructure device 200 is realized as a wireless access device, the communication module 202 supports one or more wireless data communication protocols that are also supported by the wireless network infrastructure. Any number of suitable wireless data communication protocols, techniques, or methodologies may be supported by communication module 202, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; cellular/wireless/cordless telecommunication protocols; wireless home network communication protocols; paging network protocols; magnetic induction; satellite data communication protocols; wireless hospital or health care facility network protocols such as those operating in the WMTS bands; GPRS; and proprietary wireless data communication protocols such as variants of Wireless USB. In an exemplary embodiment, communication module 202 is preferably compliant with at least the IEEE 802.11 specification and configured to support multicast data transmission. Communication module 202 may include or be realized as hardware, software, and/or firmware, as will be appreciated in the art.

In an exemplary embodiment, data traffic monitor 204 is configured to monitor the flow or amount of data processed by wireless infrastructure device 200. Data traffic monitor 204 may be implemented or performed with a processor, a content addressable memory, a digital signal processor, an application specific integrated circuit, a field programmable gate array, any suitable programmable logic device, discrete gate or transistor logic, discrete hardware components, or any combination thereof, designed to perform the functions described below. In this regard, although illustrated as disparate elements, in practice, the data traffic monitor 204 and processor 206 may be implemented in an integrated manner. In an exemplary embodiment, the data traffic monitor 204 is configured to monitor the input data rate for data received by the wireless infrastructure device 200 as well as the available output bandwidth (or alternatively, the available output data rate) for the wireless infrastructure device 200, as described in greater detail below.

In an exemplary embodiment, the processor 206 may be implemented or realized with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this regard, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration. In practice, processor 206 includes processing logic that may be configured to carry out the functions, techniques, and processing tasks associated with the operation of the wireless infrastructure device 200, as described in greater detail below. Furthermore, the steps of a method or algorithm described in connection with the embodiments disclosed herein may be embodied directly in hardware, in firmware, in a software module executed by processor 206, or in any practical combination thereof.

In an exemplary embodiment, switching logic 208, which may be partially or completely realized in the processor 206, represents processing logic and functionality associated with the data switching and communicating features of wireless infrastructure device 200. Switching logic 208 may be configured to perform conventional operations that enable data traffic in the wireless network to be communicated between wireless user devices, wireless access devices, network infrastructure devices, and network-based systems or applications.

In an exemplary embodiment, memory 210 includes sufficient data storage capacity to support the operation of wireless infrastructure device 200. Memory 210 may be realized as RAM memory, ROM memory, flash memory, registers, a hard disk, a removable disk, or any other form of storage medium known in the art. In this regard, memory 210 can be coupled to processor 206 such that processor 206 can read information from, and write information to, memory 210. In the alternative, memory 210 may be integral to processor 206. In accordance with one embodiment, one or more software modules may reside in memory 210. In an exemplary embodiment, memory 210 is utilized to store data for subsequent transmission from the wireless infrastructure device 200 in a transmission queue 214, as described in greater detail below.

Figure 3:
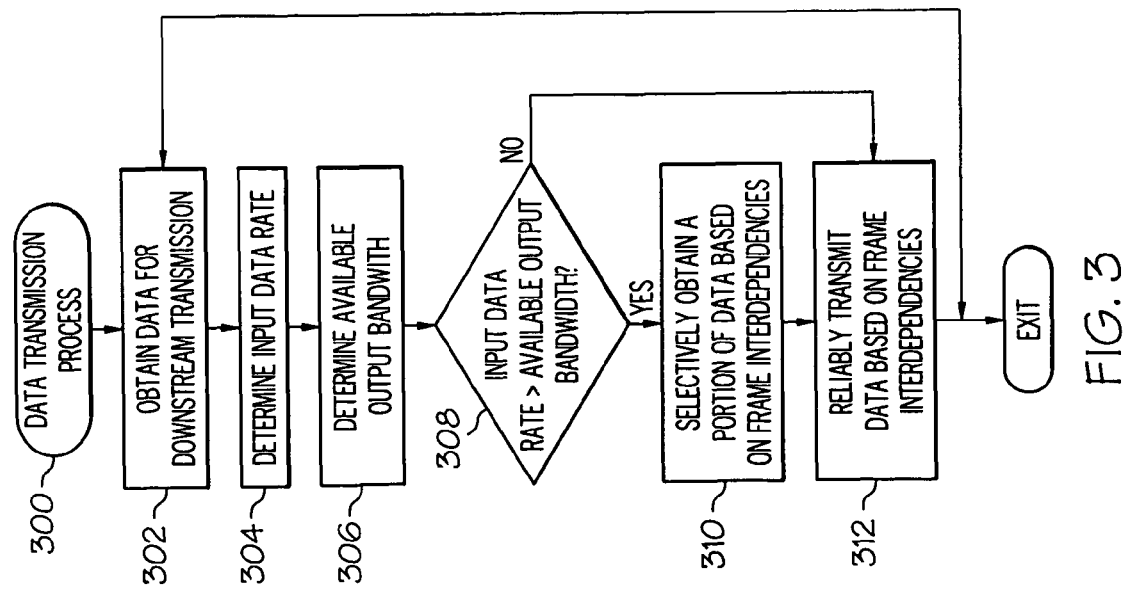
FIG. 3 is a flow diagram of a data transmission process in accordance with one embodiment.

Referring now to FIG. 3, in an exemplary embodiment, a wireless network and/or a wireless infrastructure device may be configured to perform a data transmission process 300 and additional tasks, functions, and/or operations as described below. The various tasks may be performed by software, hardware, firmware, or any combination thereof. For illustrative purposes, the following description may refer to elements mentioned above in connection with FIG. 1 and FIG. 2. In practice, the tasks, functions, and operations may be performed by different elements of the described system, such as the wireless switch 104, the wireless access device 106, the wireless infrastructure device 200, the communication module 202, the data traffic monitor 204, the processor 206, and/or memory 210. It should be appreciated any number of additional or alternative tasks may be included, and may be incorporated into a more comprehensive procedure or process having additional functionality not described in detail herein.

Referring now to FIG. 3, and with continued reference to FIG. 1 and FIG. 2, a data transmission process 300 may initialize when a network begins operation, for example, upon initialization of the network or upon resuming operation after regularly scheduled maintenance or downtime. In this regard, the data transmission process 300 initializes when a wireless infrastructure device is turned on or otherwise begins operation. The data transmission process 300 begins by obtaining data for downstream transmission (task 302). For example, a wireless infrastructure device (e.g., wireless switch 104 and/ or wireless access device 106) obtains data for retransmission and/or routing to one or more devices (e.g., wireless user devices 108) which are downstream of the wireless infrastructure device. In an exemplary embodiment, the wireless infrastructure device obtains streaming video data from the content server 102 for subsequent multicast transmission to one or more wireless user devices 108. In an exemplary embodiment, the obtained data comprises a plurality of frames, wherein each frame comprises a logical unit of data grouped based on its associated content. For example, in the case of video data, each frame corresponds to an individual image of the video. In practical embodiments, the plurality of frames may be packetized resulting in a plurality of data packets, wherein each data packet is associated with a respective frame of the data. In this manner, each frame of the data is encapsulated into one or more data packets, wherein each data packet has an identifier or tag that maintains the association between data packets and frames. In accordance with one embodiment, the frames are encapsulated into a plurality of data packets in accordance with the 802.11 standard, wherein each data packet is configured for multicast transmission to a multicast group associated with a wireless access device.

In an exemplary embodiment, the plurality of frames are interdependent, that is, at least some frames of the data depend on and/or reference at least one other frame of the data for decoding and/or processing purposes. In an exemplary embodiment, each frame of the data is assigned a decoding metric (or decoding criterion) that is indicative of the decoding significance of the respective frame in regards to decoding the other frames of the data. For example, each frame may have an associated frame type that corresponds to the decoding interdependency for the respective frame for decoding at least one other frame of the first plurality of frames, as described in greater detail below. In some embodiments, each frame may be assigned a respective profit value that corresponds to the decoding significance of the respective frame, that is, a number of remaining frames of the data that reference the respective frame. In this regard, the frame (or the one or more data packets corresponding to the frame) has an identifier or tag that indicates the decoding metric (e.g., frame type and/or profit value) for the frame.

In an exemplary embodiment, the wireless infrastructure device receives video data comprising a plurality of interdependent video frames. Each video frame has an associated video frame type indicative of whether or not the respective video frame depends on a preceding and/or succeeding video frame for proper decoding. For example, in accordance with one embodiment, the video data is encoded in accordance with a moving picture experts group (MPEG) standard, such that the video data comprises intra-coded frames (or I-frames), predictive coded frames (or P-frames), and bi-directionally predictive frames (or B-frames). An I-frame corresponds to a reference frame that is decoded without reference to another frame, that is, a frame with no decoding dependency (or no inter-frame dependency), while a P-frame corresponds to a frame that is decoded with reference to a preceding I-frame or P-frame and a B-frame corresponds to a frame that is decoded with reference to a preceding I-frame or P-frame and a succeeding I-frame or P-frame, as will be appreciated in the art. As described in greater detail below, each video frame may be assigned a profit value corresponding to (or indicative of) the decoding significance of the respective video frame in regards to the other video frames.

Due to the decoding interdependencies for the frames of the streaming, an erroneous and/or lost reference frame results in decoding errors for other frames of the data that reference the erroneous and/or lost frame. For example, an I-frame is used as a reference for decoding subsequent frames or otherwise affects decoding of subsequent frames, and therefore if an I-frame is not received or is lost in transmission, decoding errors propagates through decoding of any subsequent P-frames and/or B-frames until the next I-frame of the data stream is received. In a similar manner, because P-frame is used as a reference for subsequent P-frames and/or B-frames, if a P-frame is not received or is lost in transmission, decoding errors propagate through decoding of any subsequent P-frames and/or B-frames until another I-frame is received.

In an exemplary embodiment, the data transmission process 300 continues by determining and/or calculating the input data rate for the obtained data (task 304). In this regard, the input data rate corresponds to an amount of units of data per a unit of time, as will be appreciated in the art. For example, in accordance with one embodiment, the wireless infrastructure device 200 and/or data traffic monitor 204 may determine and/or calculate the input data rate by identifying the start of a received I-frame and counting the number of bytes until the next I-frame is received, and dividing the amount of bytes by the amount of time that elapsed between I-frames. For example, for MPEG encoded video data, the input data rate typically ranges from 2 to 4 megabits per second (Mbps) or higher. It will be appreciated in the art that the input data rate will vary depending on the application, and the subject matter is not limited to any particular input data rate or input data format.

The data transmission process 300 continues by determining the available output bandwidth (or available output data rate) for a wireless infrastructure device that will transmit the received data (task 306). In an exemplary embodiment, the available output bandwidth corresponds to the downstream bandwidth available for transmitting the obtained data, that is, the minimum available output bandwidth from the potential output bandwidths of the wireless infrastructure device that obtained the data and any downstream wireless infrastructure devices that will be utilized in transmitting the data. For example, referring to FIG. 1, the wireless switch 104 may have a first output bandwidth and the wireless access device 106 may have a second output bandwidth, wherein the data transmission process 300 determines the available output bandwidth as the lesser of the first output bandwidth and the second output bandwidth. In this manner, the data transmission process 300 accounts for any bottlenecks on the wireless network 100, that is, the wireless infrastructure device that has the most restrictive output bandwidth. As described in greater detail below, in an exemplary embodiment, the data transmission process 300 determines the available output bandwidth based on frames of the data which are transmitted in accordance with an enhanced transmission scheme (e.g., task 312) to account for dynamic changes and/or fluctuations in the available output bandwidth.

In an exemplary embodiment, the data transmission process 300 determines whether the input data rate is greater than the available output bandwidth (task 308). When the input data rate is greater than the available output bandwidth, the data transmission process 300 selectively obtains (or alternatively, selectively forwards) a portion of the obtained data based on the frame interdependencies of the obtained data (task 310). For example, although a wireless infrastructure device (e.g., wireless access device 106) may be configured to support a particular output bandwidth (e.g., 54 Mbps for 802.11a/g, 2 Mbps for 802.11b multicast, 6 Mbps for 802.11a/g multicast), in practice, the actual available output bandwidth of the device may be lower (e.g., 600 kbps to 1 Mbps).

When the input data rate exceeds the available output bandwidth, the data transmission process 300 selectively obtains a portion of the data by discarding and/or dropping a portion of the streaming data to reduce the effective rate of the data to the available output bandwidth. In an exemplary embodiment, the a first subset of the plurality of frames of the data is selectively obtained while the remaining frames are discarded and/or dropped based on their respective decoding significances and/or frame interdependencies in a manner that minimizes the downstream impact of the discarded and/or dropped data. For example, in the case of video data comprising a plurality of video frames, the data transmission process 300 selectively determines and/or obtains a subset of the plurality of video frames that comprises an optimal combination of I-frames, P-frames, and B-frames and discards and/or drops the remaining video frames of the plurality of video frames. In an exemplary embodiment, the subset of the plurality of video frames is selectively obtained based on a knapsack problem, with video frames being assigned a profit value based on the number of other video frames that reference the respective video frame (or are influenced by the respective video frame) and a cost value corresponding to the average data rate and/or bandwidth consumed by transmitting the respective video frame. For example, because an I-frame is used as a reference for decoding subsequent frames or otherwise impacts decoding of frames following the I-frame, I-frames are assigned a higher profit value, while B-frames are assigned a lower profit value because B-frames are not used as references in decoding other frames. In an exemplary embodiment, each P-frame is assigned a profit value somewhere in between the profit value assigned to I-frames and the profit value assigned to B-frames based on the positioning of the respective P-frame in the video stream and the number of frames that reference or are otherwise impacted by the respective P-frame. As a result, the video frames that are more important for decoding and/or viewing purposes are selectively obtained and transmitted, while the video frames that are less important are discarded and/or dropped. In an exemplary embodiment, the number of frames that are discarded and/or dropped is based on the ratio of the difference between the input data rate and the available output bandwidth to the input data rate. For example, assuming an input data rate for video data of 4 Mbps and an available output bandwidth for a wireless access device of 1 Mbps, the number of frames that are discarded and/or dropped is equal to ¾ of the total number of frames that comprise the input video data.

In an exemplary embodiment, the data transmission process 300 continues by reliably transmitting the selectively obtained data in a manner that is influenced by the interdependencies of the individual frames that comprise the data (task 312). As described in greater detail below, for each frame of the data, the data transmission process 300 identifies the respective decoding metric for the respective frame and transmits the respective frame based on the decoding metric. If the respective decoding metric corresponds to a relatively high decoding significance, that is, a relatively significant frame, the respective frame is transmitted in accordance with an enhanced transmission scheme (or enhanced transmission protocol). Conversely, if the respective decoding metric corresponds to a relatively low decoding significance, the respective frame is transmitted in accordance with a default transmission scheme (or a normal transmission scheme). The enhanced transmission scheme results in the respective frame being transmitted such that the respective frame is more likely to be reliably received, particularly in the case of a wireless multicast transmission. In other words, the reliability (or quality of service) of the enhanced transmission scheme is greater than the reliability of the default transmission scheme.

In an exemplary embodiment, the data transmission process 300 and/or wireless infrastructure device transmits the individual frames based on the frame interdependencies by performing an interdependent frame transmission process as described in greater detail below with reference to FIG. 4. In this manner, the data transmission process 300 transmits reference video frames (e.g., I-frames and/or P-frames) differently than video frames that are not used as references in decoding other video frames (e.g., B-frames). For example, because an I-frame is used as a reference for subsequent P-frames and/or B-frames, a lost and/or erroneous I-frame causes decoding errors that propagate through decoding of any subsequent P-frames and/or B-frames until another I-frame is received. In a similar manner, because a P-frame may be used as a reference for subsequent P-frames and/or B-frames, a lost and/or erroneous P-frame causes errors that propagate through decoding of any subsequent P-frames and/or B-frames until another I-frame is received. However, B-frames are not used as references, and therefore, erroneous and/or lost B-frames do not affect the decoding of other frames. As described in greater detail below, by ensuring that frames with greater decoding significance (e.g., I-frames and/or P-frames) are reliably received, the data transmission process 300 results in improved decoding of the video data and thus an improved user experience.

Figure 4:
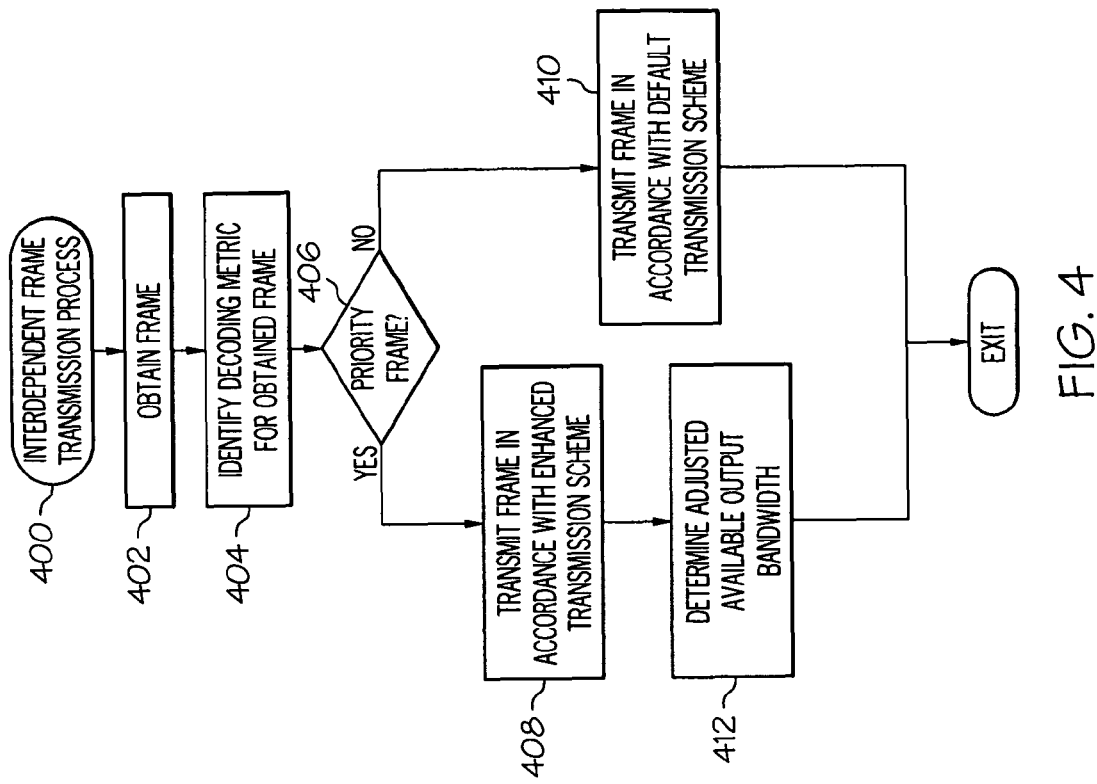
FIG. 4 is a flow diagram of an interdependent frame transmission process suitable for use with the data transmission process of FIG. 3 in accordance with one embodiment.

Referring now to FIG. 4, in accordance with one embodiment, a wireless infrastructure device and/or data transmission process 300 may be configured to perform an interdependent frame transmission process 400 and additional tasks, functions, and/or operations as described below. The various tasks may be performed by software, hardware, firmware, or any combination thereof. For illustrative purposes, the following description may refer to elements mentioned above in connection with FIG. 1 and FIG. 2. In practice, the tasks, functions, and operations may be performed by different elements of the described system, such as the wireless switch 104, the wireless access device 106, the wireless infrastructure device 200, the communication module 202, the data traffic monitor 204, the processor 206, and/or memory 210. It should be appreciated any number of additional or alternative tasks may be included, and may be incorporated into a more comprehensive procedure or process having additional functionality not described in detail herein.

Referring now to FIG. 4, and with continued reference to FIGS. 1-3, a interdependent frame transmission process 400 may initialize when a wireless infrastructure device obtains a frame for transmission and before placing the frame in its transmission queue (or output queue). In an exemplary embodiment, the interdependent frame transmission process 400 begins by obtaining the frame (or one or more data packets corresponding to the frame) and identifying the decoding metric for the obtained frame (tasks 402, 404). In this regard, the interdependent frame transmission process 400 may obtain the frame as an output and/or result of a selective forwarding process (task 310) described above. In accordance with one embodiment, the interdependent frame transmission process 400 identifies the decoding metric for the frame by inspecting and/or monitoring the identifier and/or or tag for the one or more data packets that correspond to the obtained frame.

In an exemplary embodiment, the interdependent frame transmission process 400 continues by determining and/or identifying whether the frame corresponds to a priority frame based on the decoding metric (task 406). In this regard, a priority frame should be understood as referring to a frame with a relatively high decoding significance. In accordance with one embodiment, the interdependent frame transmission process 400 may identify the frame as a priority frame based on the frame type associated with the frame. For example, the interdependent frame transmission process 400 designate all I-frames as priority frames, or all I-frames and all P-frames as priority frames, such that the interdependent frame transmission process 400 determines and/or identifies the frame as a priority frame based on the frame type for the frame. In accordance with another embodiment, the interdependent frame transmission process 400 may identify the frame as a priority frame based on the profit value associated with the frame. For example, the interdependent frame transmission process 400 may compare the profit value for the frame to a threshold value, such that the interdependent frame transmission process 400 determines and/or identifies the frame as a priority frame when the profit value associated with the frame is greater than the threshold value. It should be noted that the criteria for determining and/or identifying priority frames will vary depending on the needs of a particular application, and the subject matter is not limited to any particular classification and/or designation of priority frames.

As described in greater detail below, if the frame corresponds to a priority frame, the interdependent frame transmission process 400 transmits the frame in accordance with an enhanced transmission scheme (task 408). Depending on the embodiment, the interdependent frame transmission process 400 may transmit the frame in accordance with an enhanced transmission scheme by performing a multiple transmission process as set forth below in the context of FIG. 5 or a network traffic management process as set forth below in the context of FIG. 6. If the frame does not correspond to a priority frame, the process transmits the frame in accordance with a default transmission scheme (task 410). In the default transmission scheme, the interdependent frame transmission process 400 may transmit the frame normally, that is, the frame may be transmitted a single time in a normal and/or conventional manner for the wireless network.

In an exemplary embodiment, the interdependent frame transmission process 400 determines an adjusted available output bandwidth in response to transmitting the frame in accordance with the enhanced transmission scheme (task 412). The adjusted available output bandwidth is utilized to determine whether a portion of the input data should be discarded and/or dropped during the data transmission process 300 as set forth above (e.g., tasks 306, 308, 310). As set forth below, the enhanced transmission scheme increases the effective bandwidth consumed by the data being transmitted, which counteracts the effective bandwidth reduction achieved by the selectively discarding a portion of the input data (task 310). In this manner, the increase in effective bandwidth of the transmitted data caused by the enhanced transmission scheme is accounted for by the data transmission process 300 such that random loss of data due to bandwidth constraints (e.g., the transmission queue from overflowing) is mitigated and/or prevented. The interdependent frame transmission process 400 may repeat as desired for each frame of the data to be transmitted.

Figure 5:
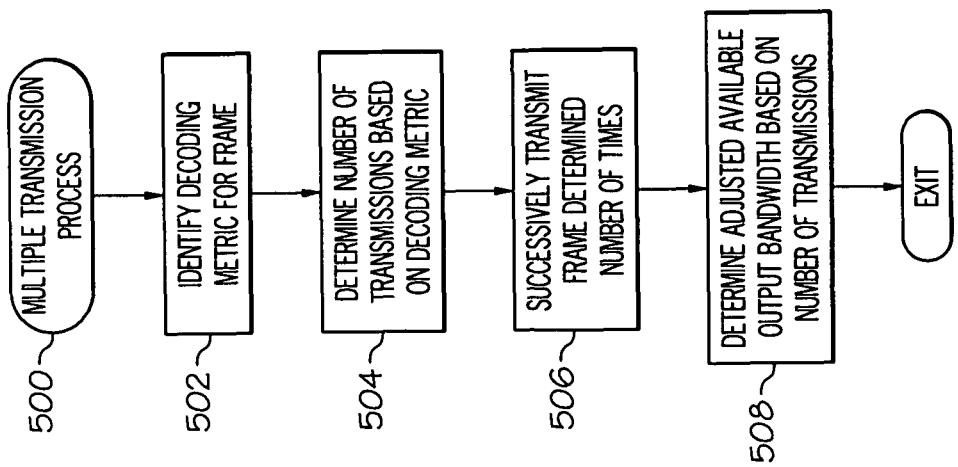
FIG. 5 is a flow diagram of a multiple transmission process suitable for use with the interdependent frame transmission process of FIG. 4 in accordance with one embodiment.

Referring now to FIG. 5, in accordance with one embodiment, a wireless infrastructure device and/or interdependent frame transmission process 400 may be configured to perform a multiple transmission process 500 and additional tasks, functions, and/or operations as described below. The various tasks may be performed by software, hardware, firmware, or any combination thereof. For illustrative purposes, the following description may refer to elements mentioned above in connection with FIG. 1 and FIG. 2. In practice, the tasks, functions, and operations may be performed by different elements of the described system, such as the wireless switch 104, the wireless access device 106, the wireless infrastructure device 200, the communication module 202, the data traffic monitor 204, the processor 206, and/or memory 210. It should be appreciated any number of additional or alternative tasks may be included, and may be incorporated into a more comprehensive procedure or process having additional functionality not described in detail herein.

Referring now to FIG. 5, and with continued reference to FIGS. 1-4, a multiple transmission process 500 may initialize in response to identifying a frame as a priority frame (e.g., task 406). The multiple transmission process 500 begins by identifying the decoding metric for the frame and determining a number of transmissions for the frame based on the decoding metric associated with the frame (tasks 502, 504). In accordance with one embodiment, the number of transmissions is based on the identified frame type for the frame, such that more significant frames are transmitted more times. For example, in the case of video data, the number of transmissions may be greater for reference frames (e.g., I-frames and/or P-frames), such that significant video frames for purposes of decoding are more reliably received. In an exemplary embodiment, when the multiple transmission process 500 identifies the frame type as corresponding to an I-frame, the multiple transmission process 500 determines a first number of transmissions for the frame. If the multiple transmission process 500 identifies the frame type as corresponding to a P-frame, the multiple transmission process 500 determines a second number of transmissions for the frame, wherein the second number is less than or equal to the first number. If the multiple transmission process 500 identifies the frame type as corresponding to a B-frame, the multiple transmission process 500 determines a third number of transmissions for the frame, wherein the third number is less than the first number and less than or equal to the second number. For example, in accordance with one embodiment, the multiple transmission process 500 determines an I-frame should be transmitted three times, while a P-frame should be transmitted twice and a B-frame should be transmitted only a single time. It should be noted that the subject matter is not limited to any particular number of times each respective frame should be transmitted, and the number of times any particular frame type is transmitted will vary depending on the needs of a particular application. For example, in situations where bandwidth is limited, it may be desirable to only transmit I-frames multiple times. In accordance with another embodiment, the number of transmissions is based on the identified profit value for the frame, such that frames having higher profit values (e.g., more significant frames) are transmitted more times than frames with lower profit values, in a similar manner as set forth above.

In an exemplary embodiment, the multiple transmission process 500 continues by successively transmitting the frame for the determined number of times (task 506). In accordance with one embodiment, the multiple transmission process 500 and/or wireless infrastructure device successively transmits the frame by copying the frame and storing and/or placing the determined number of copies of the frame in the transmission queue. The multiple transmission process 500 and/or wireless infrastructure device then successively transmits the frame by transmitting the copies successively, i.e., back-to-back or one immediately after another. For example, in the case of video data, the wireless infrastructure device may obtain a group of pictures comprising an I-frame, a P-frame, and a B-frame. The wireless infrastructure device copy the I-frame (or the data packets corresponding to the I-frame) and place a first number of copies of the I-frame in the transmission queue and copy the P-frame (or the data packets corresponding to the P-frame) and place a second number of copies of the P-frame in the transmission queue. As set forth above, because B-frames are not used as reference frames in decoding, the wireless infrastructure device may simply place the B-frame (or the data packets corresponding to the P-frame) in the transmission queue without making any copies. The wireless infrastructure device then transmits the data from the transmission queue, resulting in the I-frame being successively transmitted the first number of times followed by the P-frame being successively transmitted the second number of times, followed by the B-frame being transmitted a single time. In this manner, the likelihood of the reference frames (e.g., I-frames and/or P-frames) being reliably received is increased, while the non-reference frames (e.g., B-frames) are transmitted normally.

By transmitting and/or multicasting priority frames a multiple number of times, the multiple transmission process 500 compensates for instances where the frame may be lost and/corrupted during transmissions, for example, due to collisions or interference. This improves reliability of the transmission and/or receipt of the frame in wireless multicast networks where there would be no acknowledgement and/or notification that a transmitted frame were lost and/or corrupted. It will be appreciated in the art that the number of times the priority frame is transmitted represents a tradeoff between reliability and bandwidth consumption, as a higher number of times will improve the likelihood of the frame being accurately and reliably received but will also increase the bandwidth consumed by transmitting the frame, as described in greater detail below.

In an exemplary embodiment, the multiple transmission process 500 continues by determining an adjusted available output bandwidth based on the number of multiple transmissions for the identified priority frame (task 508). The adjusted available output bandwidth is utilized to determine whether a portion of the input data should be discarded and/or dropped during the data transmission process 300 as set forth above (e.g., tasks 306, 308, 310). In this regard, transmitting a priority frame multiple times increases the effective bandwidth consumed by the data being transmitted, which counteracts the effective bandwidth reduction achieved by the selectively discarding a portion of the input data (task 310). In this manner, the increase in effective bandwidth of the transmitted data caused by the enhanced transmission scheme is accounted for by the data transmission process 300 such that random loss of data due to bandwidth constraints (e.g., the transmission queue from overflowing) is mitigated and/or prevented.

Figure 6:
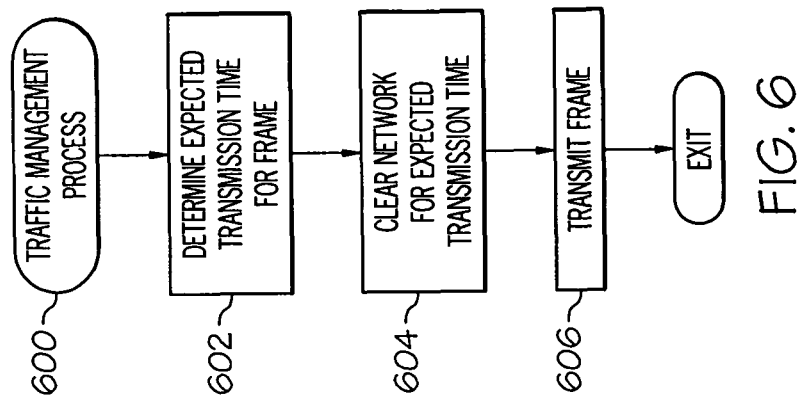
FIG. 6 is a flow diagram of a traffic management process suitable for use with the interdependent frame transmission process of FIG. 4 in accordance with one embodiment.

Referring now to FIG. 6, in accordance with another embodiment, a wireless infrastructure device and/or interdependent frame transmission process 400 may be configured to perform a traffic management process 600 and additional tasks, functions, and/or operations as described below. The various tasks may be performed by software, hardware, firmware, or any combination thereof. For illustrative purposes, the following description may refer to elements mentioned above in connection with FIG. 1 and FIG. 2. In practice, the tasks, functions, and operations may be performed by different elements of the described system, such as the wireless switch 104, the wireless access device 106, the wireless infrastructure device 200, the communication module 202, the data traffic monitor 204, the processor 206, and/or memory 210. It should be appreciated any number of additional or alternative tasks may be included, and may be incorporated into a more comprehensive procedure or process having additional functionality not described in detail herein.

Referring now to FIG. 6, and with continued reference to FIGS. 1-4, a traffic management process 600 may initialize in response to identifying a frame as a priority frame (e.g., task 406). In an exemplary embodiment, the traffic management process 600 begins by determining an expected transmission time for the frame (task 602). The expected transmission time corresponds to the estimated and/or theoretical transmission time for the frame to be transmitted from a wireless infrastructure device (e.g., wireless access device 106). In this regard, the traffic management process 600 may determine and/or calculate the expected transmission time for the frame based on the total amount of data that comprises the frame (e.g., the number of bits consumed by the one or more data packets that comprise the frame) and the frequency and/or bandwidth for transmitting the frame by the wireless infrastructure device. In accordance with one embodiment, where each frame of a particular frame type comprises the same amount of data (e.g., all I-frames are the same size and/or comprise the same number of data packets), the traffic management process 600 determines the expected transmission time based on the frame type of the frame, where each frame type has a predetermined or fixed expected transmission time based on all frames of the respective frame type being the same size. For example, I-frames may be associated with a first expected transmission time with P-frames associated with a second expected transmission time and B-frames associated with a third expected transmission time.

In response to determining the expected transmission time, the traffic management process 600 continues by clearing the network for the expected transmission time (task 604). In an exemplary embodiment, the traffic management process 600 creates a clear-to-send (CTS) frame for the expected transmission time. The CTS frame is then placed in the transmission queue immediately before the frame such that the CTS frame is transmitted before the frame. When the wireless user devices communicating with the wireless infrastructure device receive the CTS frame, the wireless user devices cease transmitting data over the wireless network for the duration of the expected transmission time (e.g., the time specified by the CTS frame) in a conventional manner, thereby clearing the network for the expected transmission time. This allows the wireless infrastructure device to subsequently transmit the priority frame (e.g., the one or more data packets comprising the priority frame) with a reduced risk of data loss from collisions or network interference. In an exemplary embodiment, after clearing the network for the expected transmission time, the traffic management process 600 continues by transmitting the frame (task 606). In this manner, by clearing the network before transmitting the priority frame, the likelihood of the priority frame being lost and/or corrupted due to collisions and/or interference is reduced, thereby improving the reliability of transmission and/or receipt of the priority frame.

Referring now to FIG. 4 and FIG. 6, depending on the embodiment, the interdependent frame transmission process 400 may determine an adjusted available output bandwidth based on a CTS frame transmitted by the traffic management process 600 (e.g., task 412). As set forth above, the adjusted available output bandwidth is utilized to determine whether a portion of the input data should be discarded and/or dropped for subsequent transmissions (tasks 306, 308, 310). In this regard, transmitting a CTS frame before any priority frames increases the effective bandwidth consumed by the data being transmitted, which counteracts the effective bandwidth reduction achieved by the selective discard process (task 310). In this manner, the increase in effective bandwidth of the CTS frame is accounted for by the data transmission process 300 such that random loss of data due to bandwidth constraints (e.g., the transmission queue from overflowing) is mitigated and/or prevented. It will be appreciated in the art however, that in practice, the CTS frame may have negligible impact on the available output bandwidth of the wireless access device.

It should be appreciated that the subject matter described herein improves the performance and/or reliability of multicast transmitting and/or streaming interdependent data in a wireless network. As set forth above, the more important frames of the interdependent data are transmitted in accordance with an enhanced transmission scheme, resulting in a more reliable receipt of the important frames of the data and thereby improved decoding and/or process of the interdependent data on the user side. For example, in the case of video data, the more significant reference frames for decoding, such as I-frames and P-frames, may be transmitted differently than less significant frames such as B-frames. The likelihood of the more significant reference frames being lost and/or corrupted due to collisions and/or network interference is reduced, thereby improving the reliability of transmission and/or receipt of the significant frames of data. In addition, when bandwidth constraints exist, the effective data rate of the video data may be selectively reduced in a manner that compensates for additional bandwidth consumption of the enhanced transmission scheme while minimizing and/or reducing random data loss. Thus, in the case of multicast streaming of video data when the available output bandwidth is limited, the subject matter described herein achieves best case performance by ensuring that the most significant frames of the data are transmitted and more reliably received.

While at least one example embodiment has been presented in the foregoing detailed description, it should be appreciated that a vast number of variations exist. It should also be appreciated that the example embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for transmitting video data in a multicast network having no data acknowledgment functionality, the video data including a plurality of video frames, each video frame of the plurality of video frames having a respective frame type indicative of a priority among the plurality of video frames, wherein decoding of less significant video frames is dependent on data from more significant respective video frames, the method comprising:

identifying the respective frame type for a video frame of the plurality of video frames, wherein the priority of the video frame corresponds to a decoding interdependency between the video frame and at least one other video frame of the plurality of video frames wherein decoding of the at least one other video frame is dependent on data from the video frame wherein a greater number of other video frames that depend on the video frame a higher the priority of the video frame, and wherein the video frame is assigned a respective profit value corresponding to a number of other video frames of the plurality of video frames that depend on data from the video frame for decoding;

when the respective frame type of the video frame is of more significance which corresponds to a high priority, transmitting the video frame in accordance with an enhanced transmission scheme comprising successively transmitting the video frame for a repeated first number of times based on the respective profit value; and when the respective frame type of the video frame is of less significance which corresponds to a low priority, transmitting the video frame in accordance with a transmission scheme comprising successively transmitting the video frame for a number of times less than the repeated first number of times.

2. The method of claim 1, wherein reliability is associated with the repeated first number of times.

3. The method of claim 1, wherein a video frame having a respective frame type of less significance is transmitted a single time.

4. The method of claim 1, wherein transmitting the respective video frame in accordance with the enhanced transmission scheme further comprises:

successively transmitting the video frame the first number of times upon receiving the video frame for routing to a device in the multicast network.

5. The method of claim 1, wherein if an input data rate is greater than an available output bandwidth of a transmitting device, video frames are discarded, wherein high profit value frames are discarded after low profit value frames.

6. The method of claim 5, wherein video frames are discarded based on a ratio of the difference between the input data rate and the available output bandwidth to the input data rate.

7. The method of claim 1, wherein transmitting the video frame in accordance with the enhanced transmission scheme further comprises:

determining an expected transmission time for the video frame;

clearing the multicast network for the expected transmission time; and transmitting the video frame after clearing the multicast network for the expected transmission time.

8. The method of claim 1, further comprising:

determining an available output bandwidth for an infrastructure device in the multicast network;

determining an input data rate for the data based on the plurality of video frames; and when the input data rate is greater than the available output bandwidth, selectively obtaining a subset of video frames from the plurality of video frames for transmitting.

9. The method of claim 8, wherein determining an adjusted available output bandwidth is based on transmitting video frames in accordance with the enhanced transmission scheme.

10. A method for multicasting video data in a wireless network having no data acknowledgment functionality, the video data comprising a plurality of video frames, each video frame of the plurality of video frames having a respective frame type indicative of a priority among the plurality of video frames, the method comprising:

determining an input data rate for the video data;

determining an available output bandwidth for an infrastructure device in the wireless network;

selectively obtaining a subset of the plurality of video frames when the input data rate is greater than the available output bandwidth; and for each video frame of the subset of the plurality of video frames:

identifying the respective frame type for the video frame, wherein the priority of the video frame corresponds to a decoding interdependency between the video frame and at least one other video frame of the plurality of video frames wherein decoding of the at least one other video frame is dependent on data from the video frame wherein a greater number of other video frames that depend on the video frame a higher the priority of the video frame, and wherein each video frame is assigned a respective profit value corresponding to a number of other video frames of the plurality of video frames that depend on data from the video frame for decoding;

when the respective frame type of the video frame is of more significance which corresponds to a high priority, transmitting the respective video frame by the infrastructure device in accordance with an enhanced transmission scheme comprising successively transmitting the video frame for a repeated first number of times based on the respective profit value; and when the respective frame type of the video frame is of less significance which corresponds to a low priority, transmitting the respective video frame by the infrastructure device in accordance with a transmission scheme comprising successively transmitting the video frame for a number of times less than the repeated first number of times.

11. The method of claim 10, wherein transmitting the respective video frame in accordance with the enhanced transmission scheme further comprises:
   determining an expected transmission time for the video frame;
   transmitting a clear-to-send frame for the expected transmission time; and
   transmitting the video frame after transmitting the clear-to-send frame.

12. The method of claim 10, wherein transmitting the respective video frame in accordance with the enhanced transmission scheme further comprises:
   transmitting the video frame upon receiving the video frame for routing to a device in the wireless network.

13. The method of claim 10, further comprising determining an adjusted available output bandwidth for the infrastructure device based on transmitting the subset of the plurality of video frames in accordance with the enhanced transmission scheme, wherein selectively obtaining the subset of the plurality of video frames comprises selectively obtaining the subset of the plurality of video frames when the input data rate is greater than the adjusted available output bandwidth.

14. A wireless infrastructure device for a wireless network, the wireless infrastructure device comprising:
   a communication module, the communication module being configured to communicate with a plurality of access devices on the wireless network with an available output bandwidth, and the communication module being configured to receive video data having an input data rate, the video data including a plurality of video frames, each video frame having a respective frame type indicative of a priority among the plurality of video frames; and
   a processor coupled to the communication module, wherein the processor and the communication module are cooperatively configured to:
   selectively obtain a subset of the plurality of video frames when the input data rate is greater than the available output bandwidth; and
   for each video frame of the subset of the plurality of video frames:
   identify the respective frame type for the video frame, wherein the priority of the video frame corresponds to a decoding interdependency between the video frame and at least one other video frame of the plurality of video frames wherein decoding of the at least one other video frame is dependent on data from the video frame wherein a greater number of other video frames that depend on the video frame a higher the priority of the video frame, and wherein each video frame is assigned a respective profit value corresponding to a number of other video frames of the plurality of video frames that depend on data from the video frame for decoding;
   transmit the video frame in accordance with an enhanced transmission scheme comprising successively transmitting the video frame for a repeated first number of times based on the respective profit value when the respective frame type of the video frame is of more significance which corresponds to a high priority; and
   transmit the video frame in accordance with a transmission scheme comprising successively transmitting the video frame for a number of times less than the repeated first number of times when the respective frame type of the video frame is of less significance which corresponds to a low priority.

15. The wireless infrastructure device of claim 14, wherein the processor and the communication module are cooperatively configured to transmit the respective video frame in accordance with the enhanced transmission scheme by:
   determining an expected transmission time for the respective video frame;
   transmitting a clear-to-send frame based on the expected transmission time; and
   transmitting the video frame after transmitting the clear-to-send frame.

16. The wireless infrastructure device of claim 14, wherein the processor and the communication module are cooperatively configured to:
   transmit the video frame in accordance with the enhanced transmission scheme upon receiving the video frame for routing to a device in the wireless network.

* * * * *